United States Patent [19]

Shimamoto et al.

[11] Patent Number: 5,008,862
[45] Date of Patent: Apr. 16, 1991

[54] OBJECT DETECTING SWITCH DEVICE

[75] Inventors: Hiroshi Shimamoto, Yokohama; Hideyuki Suzaki, Ohtsu; Yukio Yamaguchi, Nagaokakyo; Atsushi Kawano, Nagoya, all of Japan

[73] Assignee: Omron Tateisi Electronics Co., Kyoto, Japan

[21] Appl. No.: 465,603

[22] Filed: Jan. 18, 1990

Related U.S. Application Data

[63] Continuation of Ser. No. 92,358, Sep. 2, 1987, abandoned.

[30] Foreign Application Priority Data

Sep. 2, 1986 [JP] Japan .................. 61-207455

[51] Int. Cl.$^5$ .............................. G01S 15/08
[52] U.S. Cl. .................... 367/105; 367/99; 367/135; 367/903; 367/901
[58] Field of Search ............ 367/82, 99, 100, 605, 367/135, 900, 901, 903

[56] References Cited

U.S. PATENT DOCUMENTS

| 4,326,273 | 4/1982 | Vancha | 367/112 |
| 4,332,016 | 5/1982 | Berntsen | 367/103 |
| 4,489,319 | 12/1984 | Hansen | 367/98 X |
| 4,561,064 | 12/1985 | Brüggen et al. | 367/99 X |
| 4,606,015 | 8/1986 | Yamaguchi | 367/99 |
| 4,679,175 | 7/1987 | Eder et al. | . |
| 4,717,916 | 1/1988 | Adams et al. | 342/107 |
| 4,785,429 | 11/1988 | Folwell et al. | 367/99 X |

Primary Examiner—Thomas H. Tarcza
Assistant Examiner—Tod Swann
Attorney, Agent, or Firm—Fish & Richardson

[57] ABSTRACT

A switch device is disclosed for detecting an object which comprises a transducer for emitting and receiving ultrasonic signals to and from an object, a transmitter for driving the transducer, a receiver for receiving a signal from the transducer, a gate for detecting a short-distant object, a gate for detecting a long-distant object, and a circuit for setting the timings of the gates in accordance with the detecting ranges of the object.

9 Claims, 5 Drawing Sheets

FIG. 3
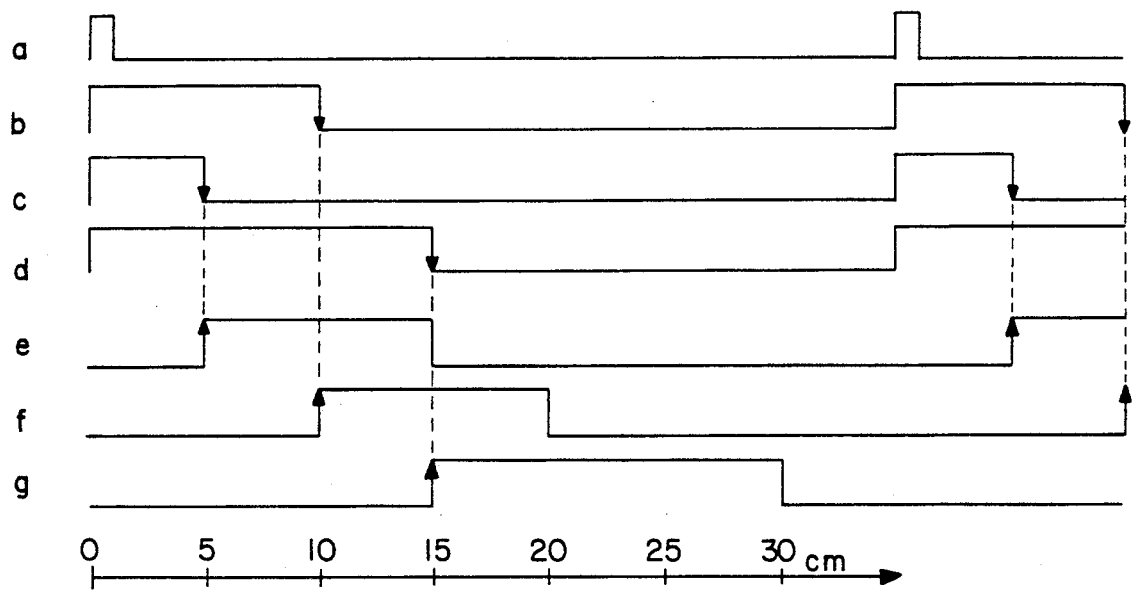
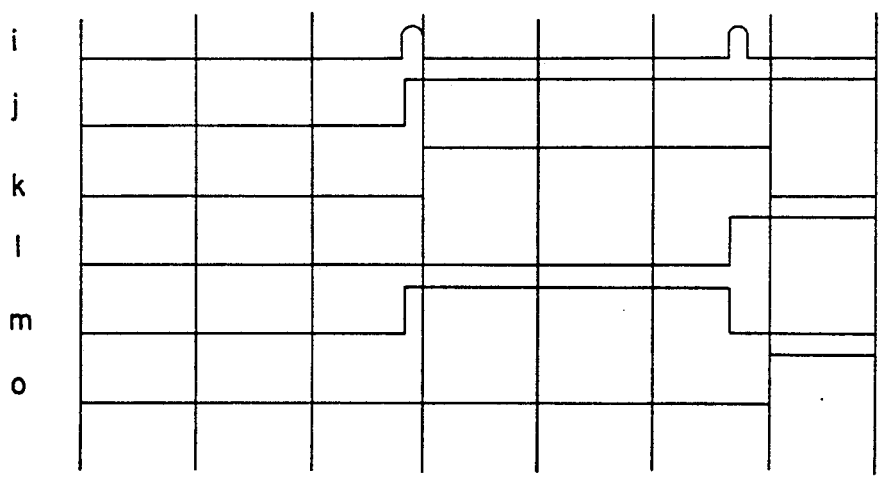

OBJECT DETECTING SWITCH DEVICE

This application is a continuation of U.S. application Ser. No. 092,358, filed Sept. 2, 1987, now abandoned.

BACKGROUND OF THE INVENTION

This invention relates to an object detecting switch device. More particularly, the invention relates to an object detecting switch device which makes use of a common transducer for transmission and reception of ultrasonic signals.

Conventionally, an ultrasonic switch device transmits and receives ultrasonic signals to and from an object to be detected. However, this kind of ultrasonic switch produces echoes which prevents the switch from detecting the object unless the object is located close enough to reflect the ultrasonic signals within the range of the echoes.

In order to detect a short-distant object having reflective ultrasonic signals within the range of the echoes, the distance of the object is calculated by measuring a time period between first and second receiving signals. In another manner, a detection signal is produced if a signal is received during the opening period of a gate.

As illustrated in FIGS. 5(A) and 5(B), immediately after an echo E, it is impossible to determine whether or not a receiving signal is a first receiving signal unless a second receiving signal arrives. In FIG. 5(A), an object is shown to be in a location of 12 cm., while in FIG. 5(B) the object is shown at a distance of 6 cm. away, which is understood by referring to the second and third receiving signals (b2 and b3), respectively.

For this purpose, however, a detecting gate needs to be kept open for a period corresponding to 40 cm. if a detecting switch is intended for detecting an object located at a distance of 20 cm.. Thus, constant reference to the first and second signals takes time in terms of object detection, and further has the disadvantage of easily picking up noises.

On the other hand, if reference is made only to the second receiving signal in the detection of an object, signals b1 and b2 cannot be distinguished between a detection range of 8 cm. or 16 cm., as shown in FIGS. 6(A) and 6(B). Thus, it is difficult to determine the range of detection displayed on a switch. Further, in FIG. 6(A), in a case wherein a detection gate is set up, for example, between a range of 10 to 15 cm., the detectable ranges are 10 to 15 cm. and 5.0 to 7.5 cm., which results in an undetectable range of 7.5 to 10.0 cm.. Consequently, a noncontinuous range is detected.

SUMMARY OF THE INVENTION

In order to solve the above-described problems, it is a primary object of this invention to provide an object detecting switch device which can detect an object located at a short distance, as well as at a long distance.

It is another object of this invention to provide an object detecting switch device which avoids picking up noises by shortening the opening time of a detection gate.

It is still another object of this invention to provide an object detecting switch device which can continuously vary its detecting range.

In accordance with one embodiment of this invention, there is provided an object detecting switch device which comprises a transducer for emitting and receiving ultrasonic signals to and from an object, a transmitter for driving the transducer, a receiver for receiving a signal from the transducer, a gate for detecting a short-distant object, a gate for detecting a long-distant object, and a circuit for setting the timings of the gates in accordance with the detecting ranges of the object.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 3 is a time chart of a wave form under a detecting range of 15 cm. when using the instant invention as shown in FIG. 1;

DETAILED DESCRIPTION OF THE PREFERRED EMBODIMENTS

Figure 1:
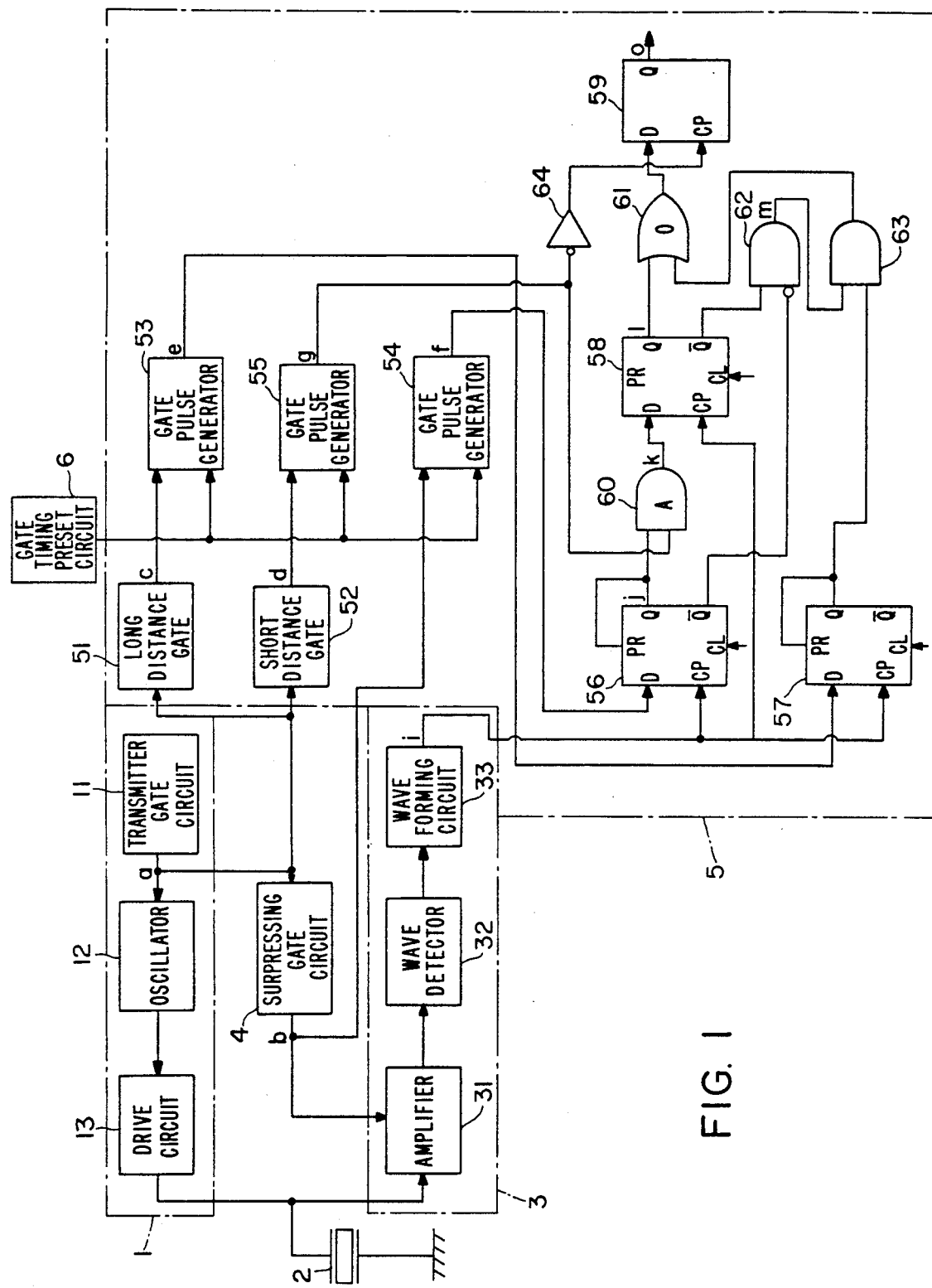
FIG. 1 is a circuit diagram representing an embodiment of an object detecting switch device in accordance with this invention.

FIG. 1 is an embodiment of this invention which comprises a transmitter 1, an ultrasonic transducer 2 driven by the transmitter 1, a receiver 3 for receiving a reflected signal, a suppressing gate 4 for suppressing an output of receiver 3 during a period corresponding to an echo, a signal processing circuit 5 for processing an output of receiver 3 to produce a detection signal, and a preset circuit 6 for presetting the timings of gates contained within the signal processing circuit 5 in accordance with a detecting range.

The transmitter 1 comprises a transmitting gate circuit 11, an oscillator 12 which is operable during an open period of the transmitting gate circuit 11, and a drive circuit 13 for driving the transducer 2 by the oscillator 12.

The receiver 3 comprises an amplifier 31 for amplifying an oscillating signal of the transducer 2, a wave detector 32, and a wave forming circuit 33 for forming an output pulse of the wave detector 32.

The suppressing gate circuit 4 provides the amplifier 31 with a suppressing signal "b" during a period corresponding to an echo from a gate signal "a" provided by the transmitting gate circuit 11.

Figure 2:
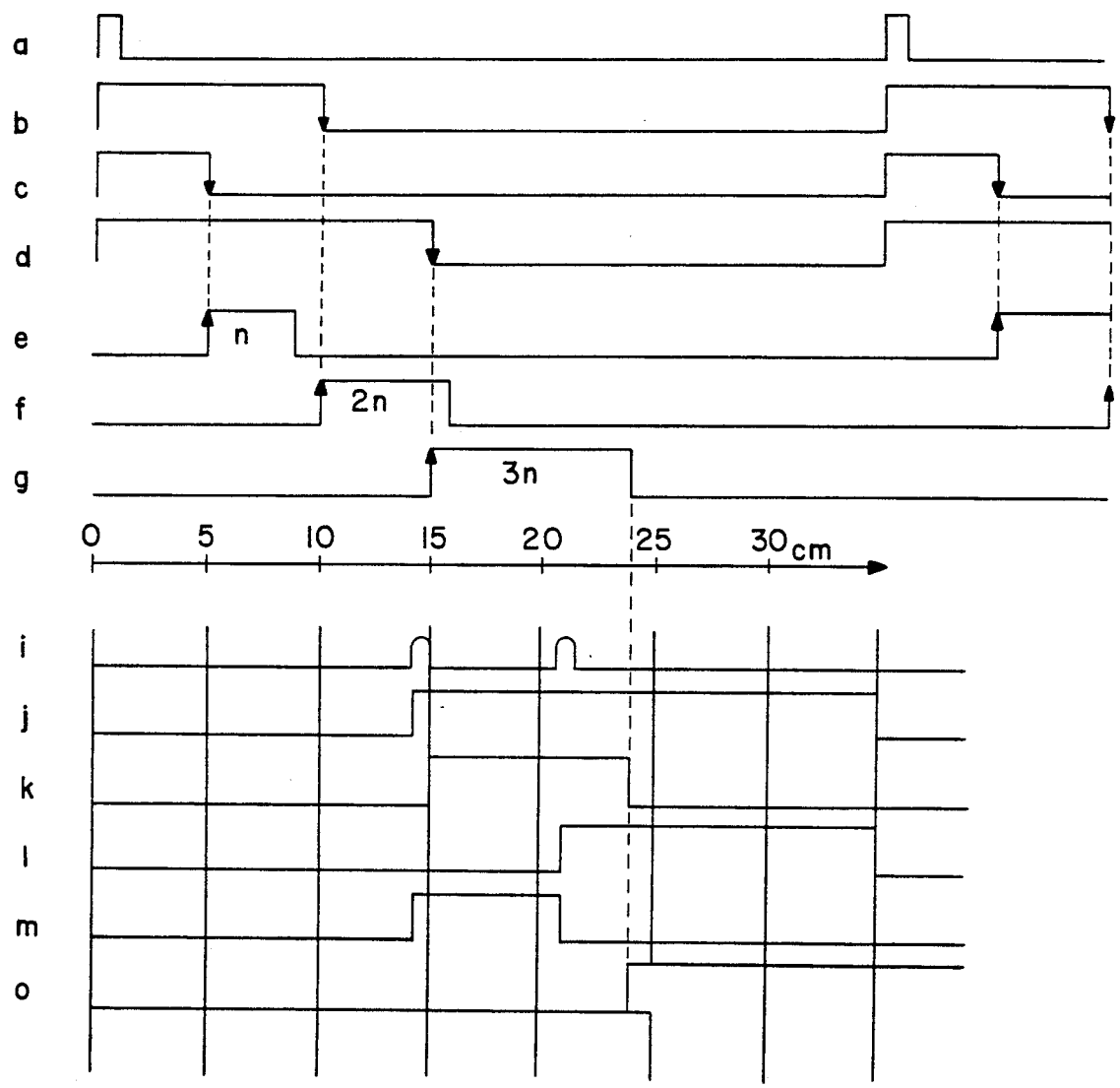
FIG. 2 is a time chart of a wave form under a detecting range of 8 cm. when using the instant invention as shown in FIG. 1.

The signal processing circuit 5 has a short-distance gate 52 and a long-distance gate 51 which, in turn, can receive a gate signal "a" from the transmitting gate circuit 11. Both gates 51 and 52 provide gate signals "c" and "d", respectively, which rise with gate signal "a" and fall on 5 and 15 cm., respectively, as shown in FIG. 2. The gate signals "a", "b", "c", and "d" have respective fixed gate timing periods.

The outputs of long-distance gate 51 and short-distance gate 52 are respectively connected to gate pulse generators 53 and 55. The output signal of suppressing gate circuit 4 is also applied to a gate pulse generator 54.

The gate pulse generators 53, 54, and 55 have preset signals applied from the gate timing preset circuit 6.

The gate pulse generator 53 provides a gate signal "e" which rises on a falling edge of signal "c" and falls on a detecting range, designated as "n" (see FIG. 2), which is preset by preset circuit 6. The gate pulse generator 54 provides a gate signal "f" which rises on a falling edge of signal "b" and falls on a detecting range, designated as "2n". The pulse generator 55 provides a gate signal "g" which rises on a falling edge of signal "d" and falls on a detecting range, designated as "3n".

Thus, gate signals "e", "f", and "g" rise on 5 cm., 10 cm., and 15 cm., respectively, while falling on detecting ranges designated as "n", "2n", and "3n", respectively (wherein "n" is less than 10 cm.), which are variable according to detecting ranges.

The output of wave forming circuit 33 is connected to cp terminals of flip-flop circuits 56, 57 and 58. The outputs of gate pulse generators 53 and 54 are connected to D terminals of flip-flop circuits 57 and 56, respectively. The output of gate pulse generator 55 is connected to an AND gate 60 and a cp terminal of a flip-flop circuit 59 through an inverter 64. An output Q of flip-flop circuit 56 is connected to the AND gate 60 having its output in turn connected to a D terminal of flip-flop circuit 58. An output Q of flip-flop circuit 58 is connected to a D terminal of flip-flop circuit 59 through an OR gate 61 and its output Q' is connected to one input of prohibit gate 62. The other input of prohibit gate 62 is connected from output Q' of flip-flop circuit 56. The output of prohibit gate 62 is connected to an AND gate 63. Another input of the AND gate 63 is provided from an output Q of flip-flop circuit 57. The output of the AND gate 63 is in turn connected to the D terminal of flip-flop circuit 59 through the OR gate 61.

The operation of an embodiment of the object detecting switch device of the instant invention is hereinafter described. The following examples of detecting ranges at 8 cm., 15 cm. and 20 cm. are described for illustrating the operation of the above-discussed embodiment of the object detecting switch device:

1. Preset detecting range of 8 cm.

Gate signals "a", "b", "c" and "d" are fixed as shown in FIG. 2. Gate signals "e", "f" and "g" are preset by preset circuit 6 to have opening periods of 5 to 8 cm., 10 to 16 cm., and 15 to 24 cm., respectively.

Assuming that the distance of an object to be detected is 7 cm., wherein the first reflective signal is obtained within a period of gate signal "e", the gate signal "e" is suppressed by suppress signal "b" so that wave forming circuit 33 does not receive any pulse signals and output Q of flip-flop circuit 57 stays low. The second reflective signal returns at the point of 14 cm., designated as "i" in FIG. 2, whereby gate signal "f" is high so that flip-flop circuit 56 is set to make its output Q high, designated as "j" in FIG. 2. The AND gate 60 provides an output "k" at the distance of 15 cm., wherein gate signal "g" becomes high. The output "k" remains high up to the point of 24 cm., wherein gate signal "g" goes down.

The third reflective signal, designated as "i", comes at a distance of 21 cm.. Here, the flip-flop circuit 58 is set to make its output "1" at a high level based on the output of the AND gate 60. The output "m" of prohibit gate 62 remains high after the setting of flip-flop circuit 56 and until the setting of flip-flop circuit 58 in which case the signal "1" goes up (see FIG. 2). However, the output signal "m" is low at the point of 24 cm., wherein gate signal "g" goes down. When gate signal "g" goes down, cp terminal of flip-flop circuit 59 is set at a high level through inverter 64, so that flip-flop circuit 59 is set to provide a detection signal "o", as shown in FIG. 2.

2. Preset detecting range of 15 cm.

In this case, gate signals "e", "f" and "g" are preset to provide gate opening periods of 5 to 15 cm., 10 to 20 cm., and 15 to 30 cm., respectively. Assuming that the distance of an object to be detected is 14 cm., wherein the first reflective signal comes back at a point wherein gate signals "e" and "f" are high and the suppressing gate signal "b" is low, receiving signal "i" is applied from wave forming circuit 33 to the cp terminals of the flip-flop circuits 56 and 57. Thus, flip-flop circuits 56 and 57 are set to their outputs Q at a high level. Further, the AND gate 60 provides output "k" when gate signal "g" becomes high at the point of 15 cm. The output "k" remains high up to 30 cm., wherein gate signal "g" goes down. As illustrated in FIG. 3, the second reflective signal "i" comes in at the point of 28 cm., wherein flip-flop circuit 58 is set to provide a signal "1". At the distance of 30 cm. wherein gate signal "g" goes down, the signal "1" is inputted into flip-flop circuit 59 through the OR gate 61, in order to produce a detecting signal "o".

3. Preset detecting range of 20 cm.

In this case, presetting of gate timings using preset circuit 6 is performed so that gate signals "e", "f", and "g" have opening periods of 5 to 20 cm., 10 to 20 cm., and 15 to 30 cm., respectively.

Figure 4:
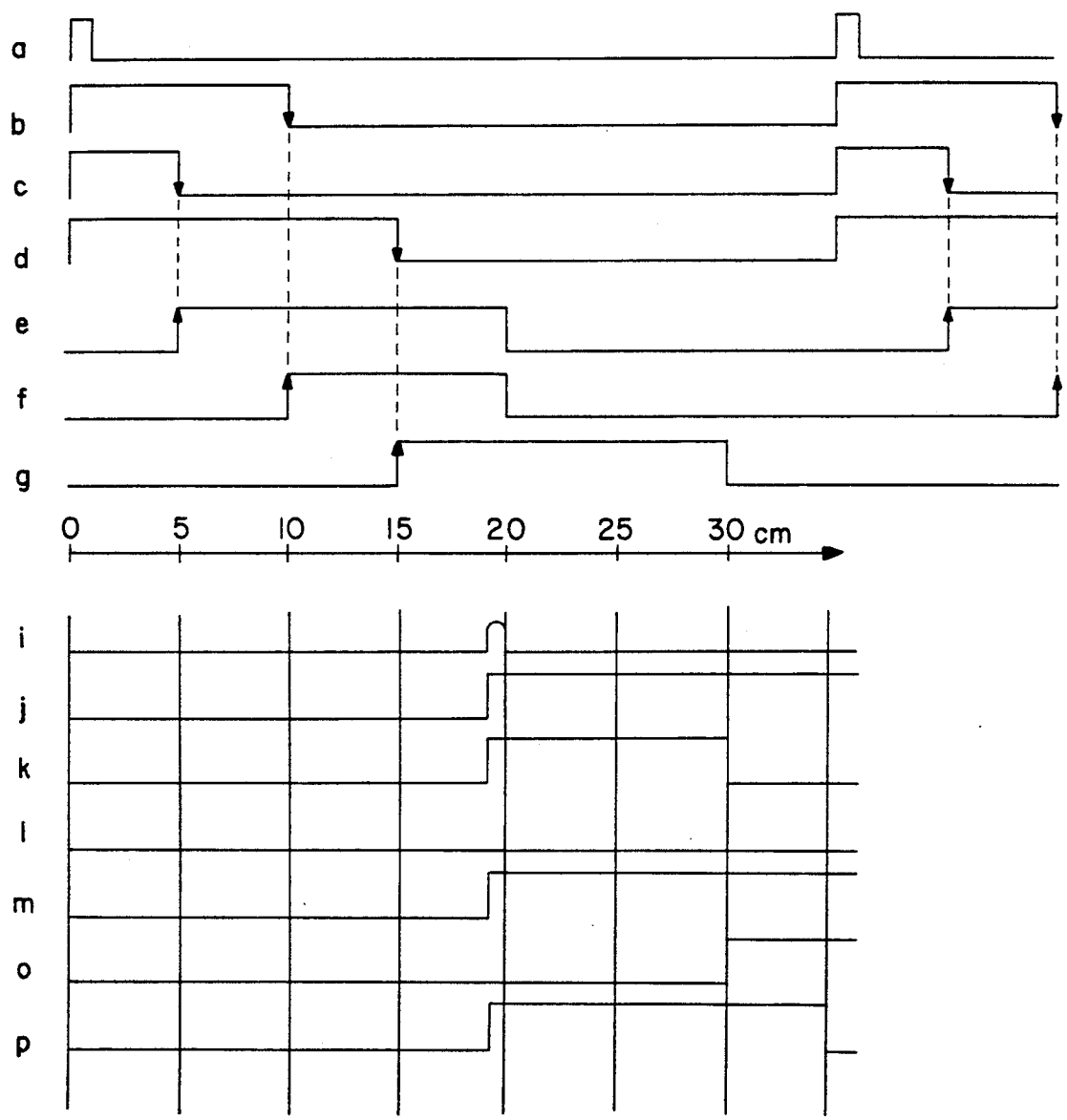
FIG. 4 is a time chart of a wave form under a detecting range of 20 cm. when using the instant invention as shown in FIG. 1.
Figure 5A:
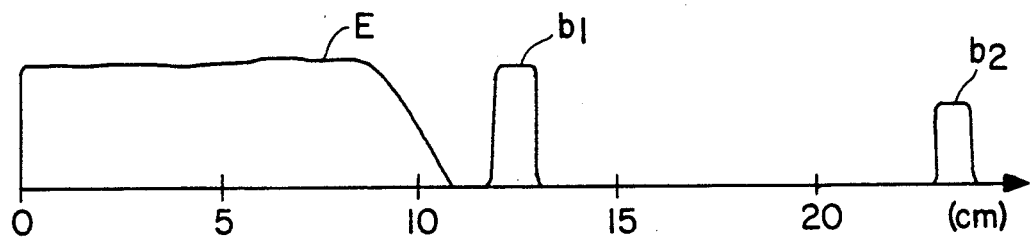
FIGS. 5(A) and 5(B) are time charts for use in describing a problem inherent in a conventional detecting switch device.
Figure 5B:
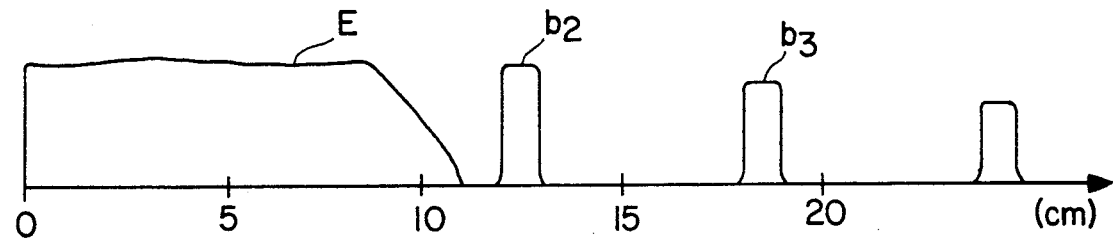
Figure 6A:
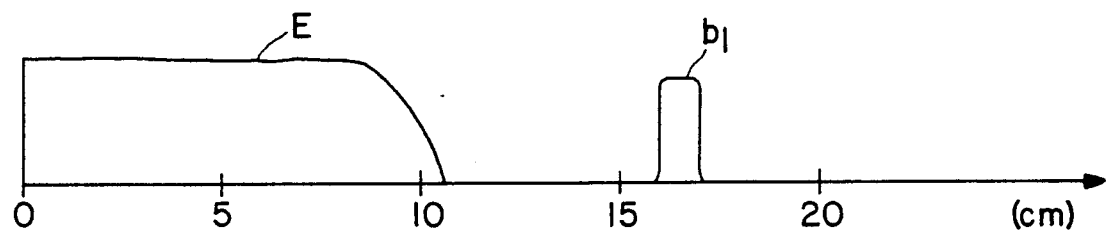
FIGS. 6(A) and 6(B) are time charts for use in describing another problem inherent in a conventional detecting switch device.
Figure 6B:
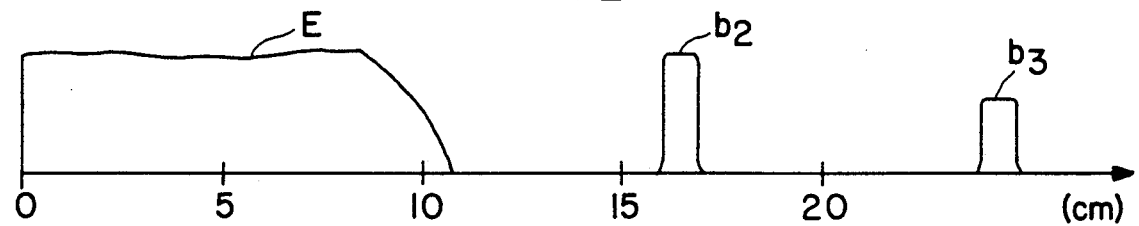

Here, it is assumed that the distance of an object to be detected is 19 cm., wherein the first reflective signal comes in when gate signals "e", "f" and "g" are all high and suppressing signal "b" is low, as illustrated in FIG. 4. Consequently, a reflective signal "i" is provided from wave forming circuit 33 and inputted to the cp terminals of flip-flop circuits 56 and 57, which in turn sets flip-flop circuits 56 and 57 to produce output signals "j" and "p".

The AND gate 60 produces output "k" at a distance of 19 cm. which remains at a high level up to 30 cm., wherein gate signal "g" goes down. However, another reflective signal is not received at the cp terminal of flip-flop circuit 58 which consequently keeps the output Q of flip-flop circuit 58, designated as "1" shown in FIG. 4, at a low level.

On the other hand, when the output Q' of the flip-flop circuit 56 becomes low at the distance of 19 cm., wherein the first reflective signal comes in, the output "m" of the prohibit gate 62 becomes high resulting in the high-state of the AND gate 63. The high signal from the AND gate 63 is applied to the D terminal of flip-flop circuit 59 through the OR gate 61, and thereafter inputted into flip-flop circuit 59 in order to produce a detection signal "o" at the point of 30 cm., wherein the gate signal "g" goes down.

In the above-described structural arrangement and operations, in accordance to an embodiment of this invention, it is possible to detect an object not only at a short distance away, but also at a long distance by continuously adjusting the detecting range. Moreover, multiple reflective signals are applied only for detecting a short-distance object, so that it is possible to generally keep reflective signals at high levels. Further, gate opening periods are shorter with the instant invention, thereby significantly reducing the noise being picked up.

While the invention has been particularly shown and described in reference to preferred embodiments thereof, it will be understood by those skilled in the art that changes in form and details may be made without departing from the spirit and scope of the invention.

What is claimed is:

1. A switch device, comprising:
   a transducer for emitting ultrasonic pulses to and receiving reflected ultrasonic pulses from an object;
   a driving means for driving the transducer with at least one original drive signal;
   a processor for processing a plurality of said reflected ultrasonic pulses from the transducer;
   gate pulse generating means for generating a plurality of gate pulses allowing detection of at least two of first, second and third reflected ultrasonic pulses corresponding to each of said at least one original drive signals;
   a pulse variation means for varying duration of any of said plurality of gate pulses; and
   determination means for determining a distance from the transducer to said object utilizing said plurality of gate pulses and at least two of said first, second or third reflected ultrasonic pulses.

2. The switch device as in claim 1, wherein the drive means comprises:
   a transmitting gate circuit;
   an oscillator which is operable during an open period of the transmitting gate circuit; and
   a drive circuit for driving the transducer by the oscillator.

3. The switch device as in claim 1, wherein the processor comprises:
   an amplifier for amplifying an oscillating signal of the transducer;
   a wave detector; and
   a wave forming circuit for forming an output pulse of the wave detector.

4. The switch device as claimed in claim 1, wherein said gate pulse generating means comprises:
   a first gate pulse generator for generating a first gate pulse for detecting said first reflected ultrasonic pulse;
   a second gate pulse generator for generating a second gate pulse for detecting said second reflected ultrasonic pulse; and
   a third gate pulse generator for generating a third gate pulse for detecting said third reflected ultrasonic pulse.

5. A switch device, comprising:
   a transducer for emitting ultrasonic pulses to and receiving reflected ultrasonic signals from an object;
   a drive means for driving the transducer;
   a processor for processing a reflected pulse from the transducer;
   a gate for suppressing an output of the processor during a time period corresponding to an echo of the transducer;
   a signal processing circuit for processing an output of the processor for producing a detection signal; and
   a preset circuit for presetting the timing of gates contained within the signal processing circuit in accordance with a detecting range.

6. The switch device as in claim 5, wherein the drive means comprises:
   a transmitting gate circuit;
   an oscillator which is operable during an open period of the transmitting gate circuit; and
   a drive circuit for driving the transducer by the oscillator.

7. The switch device as in claim 5, wherein the processor comprises:
   an amplifier for amplifying an oscillating signal of the transducer;
   a wave detector; and
   a wave forming circuit for forming an output pulse of the wave detector.

8. The switch device as in claim 7, wherein the suppressing gate circuit provides the amplifier with a suppressing signal during a period corresponding to an echo from a gate signal which is provided by the transmitting gate circuit.

9. The switch device as in claim 5, wherein the signal processing circuit has a short-distance gate and long-distance gate which can receive a gate signal from the transmitting gate circuit.

* * * * *